United States Patent Office 3,061,653
Patented Oct. 30, 1962

3,061,653
PREPARATION OF 2,3-DICHLOROBUTADIENE-1,3
Clare A. Stewart, Jr., Brandywine Hundred, Del., assignor to E. I. du Pont de Nemours and Company, Wilmington, Del., a corporation of Delaware
No Drawing. Filed Mar. 14, 1961, Ser. No. 95,503
9 Claims. (Cl. 260—655)

This invention relates to a process for the preparation of 2,3-dichlorobutadiene-1,3, 2,3-dibromobutadiene-1,3 and 2-chloro-3-bromobutadiene-1,3 (all three of these compounds will hereafter be included in the term 2,3-dihalobutadiene-1,3) and more particularly to a process wherein 1,4-dihalobutyne-2 or 2-butynediol-1,4 is converted to 2,3-dihalobutadiene-1,3.

This application is a continuation-in-part of my copending application Serial No. 777,195, filed December 1, 1958, and now abandoned.

It is an object of the present invention to provide a process for the preparation of 2,3-dihalobutadiene-1,3. A further object is to provide a process for the preparation of 2,3-dihalobutadiene-1,3 from 1,4-dihalobutyne-2. A still further object is to provide a process for the preparation of 2,3-dihalobutadiene-1,3 from 2-butynediol-1,4. Other objects will appear hereinafter.

These and other objects of this invention are accomplished by the following processes for the preparation of 2,3-dihalobutadiene-1,3. In the first of these, 2,3-dihalobutadiene-1,3 is prepared by contacting 1,4-dihalobutyne-2 at a temperature of from about 20° C. to 150° C. with a liquid catalyst, said catalyst being obtained by mixing the appropriate cuprous halide and a solubilizing agent which yields the desired halide ions, and recovering the 2,3-dihalobutadiene-1,3 which forms. It is to be understood in the following description that when 2,3-dichlorobutadiene-1,3 is to be prepared, 1,4-dichlorobutyne-2 is contacted with cuprous chloride in the presence of a solubilizing agent which yields chloride ions and that when 2,3-dibromobutadiene-1,3 is to be prepared, 1,4-dibromobutyne-2 is contacted with a liquid catalyst comprising cuprous bromide and a solubilizing agent which yields bromide ions. When 2-chloro-3-bromobutadiene-1,3 is to be prepared, 1,4-dichlorobutyne-2, 1,4-dibromobutyne-2 or 1-chloro-4-bromobutyne-2 may be used as starting materials. The compound is contacted with the appropriate cuprous halide and solubilizing agent. Thus, when preparing 2-chloro-3-bromobutadiene-1,3 from 1,4-dichlorobutyne-2, a mixture of cuprous chloride and cuprous bromide may be used with solubilizing agents which yield both chloride and bromide ions. For convenience, the terms "halo" or "halide" will be used throughout the specification and claims to indicate whichever halide is appropriate to the particular compound being prepared, it being understood that these terms include chlorine and/or bromine.

This process is relatively simple to operate in that it is merely necessary to contact the 1,4-dihalobutyne-2 with a liquid catalyst and to remove the 2,3-dihalobutadiene-1,3 as it forms. This separation can be readily accomplished by distillation or by other means. For example, the reaction mixture may be extracted by a solvent in which the catalyst is relatively insoluble and the extract then fractionally distilled. Any unconverted 1,4-dihalobutyne-2 which remains after the separation may be recycled for further contact with the catalyst.

The liquid catalyst which is used is obtained by mixing the appropriate cuprous halide with a solubilizing agent which yields the appropriate halide ions in the reaction medium. The activity of the cuprous halide appears to be highly specific since it has been determined that other halides such as calcium halide, zinc halide or mercuric halide cannot be substituted for the cuprous halide. As a matter of fact, the cuprous halide cannot be used itself without the use of a solubilizing agent. It is believed that the solubilizing agent is necessary in order to have the cuprous halide existing in the reaction medium as a well-dispersed liquid phase. The solubilizing agent forms a complex with the cuprous halide, at least in the liquid phase. This complex may be introduced into the reaction medium as such or, alternatively, the cuprous halide and the solubilizing agent may be separately introduced into the reaction medium and the liquid complex then formed in situ. It is to be understood that the catalyst need only exist as a liquid phase at the time the 1,4-dihalobutyne-2 is isomerized. Therefore, this catalyst may be a solid at temperature below the reaction temperature.

In general, the liquid catalyst consists of a solution containing from about 2 to 60% by weight of the cuprous halide. For every molecule of this cuprous halide there should be present from about 1 to 4 molecules of solubilizing agent. If desired, an inert solvent, i.e. one which does not cause side reactions during the isomerization reaction, may be used in the formation of the liquid catalyst. This permits the use of solubilizing agents whose mixtures with the cuprous halide would otherwise be too high melting to employ as a liquid.

The solubilizing agents which are used in conjunction with the cuprous halide in the isomerization of the 1,4-dihalobutyne-2 to the 2,3-dihalobutadiene-1,3 may be any of a wide variety of compounds. In general, these agents are hydrogen halide or solubilizing salts which yield halide ions in the reaction medium. The preferred solubilizing agents are hydrogen chloride, hydrogen bromide, aliphatic primary or secondary amine hydrohalides such as methylamine hydrochloride, methylamine hydrobromide, dimethylamine hydrochloride, and dimethylamine hydrobromide. Other hydrohalides may be used provided that a stable and soluble catalyst is obtained. Also, aqueous solutions of an ammonium halide, alkali metal halides, such as sodium chloride, potassium chloride, sodium bromide, and potassium bromide, and alkaline earth halides, such as calcium chloride, calcium bromide, magnesium chloride, and magnesium bromide are effective solubilizing media for the cuprous halide and may be used.

In carrying out the isomerization process, it is preferred to employ an organic solvent such as a carboxylic acid amide which dissolves both the 1,4-dihalobutyne-2 and the 2,3-dihalobutadiene-1,3 as well as appreciable quantities of the mixture of the cuprous halide and the solubilizing agent. If the process is to be operated by distilling the 2,3-dihalobutadiene-1, from the reaction zone, it is preferable to choose a solvent boiling appreciably higher than the dihalobutadiene. In the case of the dichloro compound, dimethylformamide is the preferred solvent; however, formamide, N-methylacetamide, N,N-dimethylbenzamide, N,N-diethylbenzenesulfonamide and tetramethylurea are also suitable. In the case of 2,3 - dibromobutadiene - 1,3, suitable solvents are N,N-dimethylbenzamide and N,N-diethylbenzenesulfonamide.

In general, any inert organic solvent capable of dissolving the mixture of the cuprous halide and solubilizing agent is applicable. It is also possible to use compounds that are solids at room temperature provided that they form a liquid solution with the reactants at the desired operating temperature.

It is also possible to operate the isomerization process without the use of a solvent by employing a fluid mixture of the cuprous halide and the solubilizing agent. This is generally feasible only with substituted ammonium halides since the temperatures required to produce a liquid catalyst when other solubilizing agents are used is so high that extensive decomposition of the organic materials occurs. For example, a mixture of cuprous chloride with approximately an equal weight of methylamine hydrochloride, dimethylamine hydrochloride or ethylamine hydrochloride will be molten at 125° C. and may be employed as a catalyst for the preparation of 2,3-dichlorobutadiene-1,3.

The ratio of catalyst to the 1,4-dihalobutyne-2 is not critcal. Since the isomerization occurs predominantly in the catalyst solution, there is no advantage in having more of the 1,4-dihalobutyne-2 present than will dissolve in the catalyst solution. In fact, it will require an excessive residence time which can decrease the yield of product because of the thermal sensitivity of the 1,4-dihalobutyne-2 and the 2,3-dihalobutadiene-1,3.

The isomerization reaction of the 1,4-dihalobutyne-2 to the 2,3-dihalobutadiene-1,3 occurs at temperatures of from about 20° C. to 150° C. and at pressures which may be subatmospheric, atmospheric or superatmospheric. It is preferred to operate at a temperature of from about 60° C. to 120° C. At temperatures below 60° C. the reaction proceeds very slowly while at temperatures above 120° C. decomposition and polymerization of the 2,3-dihalobutadiene-1,3 product may occur. However, the disadvantages of operating at temperatures between 120° C. and 150° C. may be minimized by decreasing the residence time and by adding suitable antioxidants and polymerization inhibitors to the reaction components.

Another method available for the preparation of 2,3-dihalobutadiene-1,3 is to start with 2-butynediol-1,4. This can be done by several procedures. In the first of these the 2-butynediol-1,4 is converted to the bishaloformate by reaction with a carbonyl halide, i.e. phosgene or bromophosgene. The bishaloformate is then decomposed to yield 1,4-dihalobutyne-2 which is then contacted with the liquid cuprous halide catalyst and rearranged in the manner heretofore described. 1,4-dibromobutyne-2 may also be prepared by reacting 2-butynediol-1,4 with phosphorous tribromide in benzene at room temperature as disclosed in Journal of the Chemical Society, 1946, page 1009. The 1,4-dibromobutyne-2 is then contacted with the liquid cuprous bromide catalyst and rearranged in the manner heretofore described.

If desired, the 2,3-dihalobutadiene-1,3 can be made directly from 2-butynediol-1,4 by contacting the latter with the liquid cuprous halide catalyst described above, under acidic conditions at temperatures ranging from about 60° C. to about 150° C. At least two molecules of a hydrogen halide should be supplied for every molecule of 2-butynediol-1,4. The reaction medium must be strongly acidic and in order to provide the proper acidic conditions the liquid catalyst must contain acid in an amount which is equivalent to at least 0.5% by weight of free hydrogen halide, based on the weight of the liquid catalyst. As mentioned above, the liquid cuprous halide catalyst must be present, and in preparing this catalyst any of the solubilizing agents mentioned above may be used. The process can be carried out at subatmospheric pressure, atmospheric pressure, or superatmospheric pressure. In operating the process it is preferred to introduce a solution of 2-butynediol-1,4 in the hydrogen halide acid into a hot solution of the cuprous halide in the hydrogen halide acid and to steam distill the 2,3-dihalobutadiene-1,3 from the reaction zone as fast as it is formed. The order of addition can be reversed or all the components can be brought together simultaneously. In any case it is desirable to minimize the residence time of the 2,3-dihalobutadiene-1,3 at the reaction temperature to avoid its polymerization.

In preparing 2,3-dihalobutadiene-1,3 directly from 2-buynediol-1,4 there is the possibility that 1,4-dihalobutyne-2 is formed as an intermediate and then isomerized as described above. It is to be understood, however, that applicant is not to be bound by any particular theory as to how the reaction takes place when 2-butynediol-1,4 is used as the starting material.

The following examples will better illustrate the nature of the present invention; however, the invention is not intended to be limited to these examples. Parts are by weight unless otherwise indicated.

*Example 1*

A mixture containing 25 ml. of 1,4-dichlorobutyne-2, 3.2 g. of cuprous chloride, 1.6 g. of ethylamine hydrochloride, 5 ml. of dimethylformamide, and 0.1 g. of p-tert-butyl catechol is refluxed at a head temperature of 45–50° C. (90–110 mm. Hg.) for a period of about ½ hour in a 100-cc. round-bottom flask equipped with a magnetic stirrer. 24.5 grams of 2,3-dichlorobutadiene-1,3, B.P. 45–50° C. (90–110 mm. Hg) is then collected from a distillation column attached to the reaction vessel.

*Example 2*

25 milliliters of 1,4-dichlorobutyne-2, 8 g. of methylamine hydrochloride, 8 g. of cuprous chloride, 16 ml. of dimethyl benzamide, 0.05 g. of phenothiazine and 0.05 g. of p-tert-butyl catechol are introduced into a 100-cc. round-bottom flask equipped with a magnetic stirrer and a distillation column. The pressure in the system is reduced to about 85 to 90 mm. Hg; heat is then applied. Over a time interval of about 90 minutes 28.5 g. of 2,3-dichlorobutadiene-1,3 is collected at a head temperature of 39 to 45° C. (85 to 90 mm. Hg).

*Example 3*

Mixtures were prepared in 17-cc. glass vials by adding 5 ml. of 1,4-dichlorobutyne-2 to each of the following catalyst candidates: 0.2 g. of copper powder (sulfuric acid washed); 0.2 g. of solid cuprous chloride; 0.2 g. of mercuric chloride; 0.2 g. of zinc chloride; a mixture of 0.1 g. of solid cuprous chloride and 0.15 cc. of piperidine. The vials were then closed with polyethylene caps, heated at 100° C. for 7 hours, and finally allowed to stand one week at room temperature.

The infrared spectra of each of these mixtures was subsequently examined. No evidence was found showing that isomerization had occurred.

*Example 4*

33 grams of cuprous chloride, 50 g. of methylamine hydrochloride, 0.5 g. of copper powder and 0.1 g. of p-tert-butyl catechol and 75 ml. of concentrated hydrochloric acid are introduced into a reaction vessel and saturated at room temperature with a stream of hydrogen chloride gas. 25 milliliters of 1,4-dichlorobutyne-2 is added to the mixture obtained by stirring these components at room temperature. Heat evolution occurs. After about 2 hours external heat is applied. The mixture is heated with stirring at atmospheric pressure to 80° C. during the next 1½ hours while a stream of hydrogen chloride gas is continually introduced.

The mixture is then maintained at 80° C. for about 40 minutes. Finally, steam distillation is carried out at a pot temperature of about 110° C. (760 mm. Hg). Approximately 8.5 ml. of 2,3-dichlorobutadiene-1,3 and 8.5 ml. of 1,4-dichlorobutyne-2 are separated from the steam distillate.

*Example 5*

A 500 milliliter flask is employed equipped with a gas inlet tube, a thermometer, a stirrer, and a condenser cooled with solid carbon dioxide. 43 grams of 2-butynediol-1,4, 10 ml. of dimethylformamide and 3.5 g. of methylamine hydrochloride are added. This mixture is cooled to a temperature of about 5 to 10° C. During the next 2 hours about 150 g. of gaseous phosgene is introduced; hydrogen chloride evolution occurs. After the phosgene has been added, the temperature of the mixture is raised to about 50° C. over a period of 90 minutes. A sudden temperature increase then occurs and much carbon dioxide gas is evolved as 1,4-dichlorobutyne-2 is formed. External cooling is applied to keep the temperature from exceeding 80° C. After the evolution of heat slackens, external heat is applied and the temperature of the mixture is adjusted to about 110° C. The mixture is then allowed to cool to room temperature.

7 grams of cuprous chloride and 0.1 g. of p-tert-butyl catechol are introduced and a distillation head is attached to the reaction vessel. The pressure is lowered to about 100 mm. Hg and the mixture is heated. 48 grams of distillate is collected at a head temperature of 40 to 65° C. (100 mm. Hg). This material is predominantly 2,3-dichlorobutadiene-1,3, the remainder being dimethyl formamide and 1,4-dichlorobutyne-2.

*Example 6*

Into a 2-liter round-bottom glass reaction vessel are introduced: 350 ml. of concentrated hydrochloric acid, 80 g. of cuprous chloride, 40 g. of potassium chloride, 5 g. of copper powder, and 1 g. of phenothiazine. Nitrogen (containing 1 mol percent nitric oxide) is introduced into the flask while heat is applied to raise the temperature of the mixture to 80° C. Then a mixture at room temperature of 172 g. of 2-butynediol-1,4 and 340 ml. of concentrated hydrochloric acid is added over a period of about one minute to the reaction vessel. Heat is applied and the temperature is raised from 61° to 80° C. in about 4 minutes. After the reaction mixture has been stirred at 80° C. for 30 minutes the 2,3-dichlorobutadiene-1,3 is removed by distillation at 40° C.

*Example 7*

To a well-stirred mixture consisting of 880 ml. of concentrated hydrochloric acid, 200 g. of cuprous chloride, 100 g. of potassium chloride, 15 g. of copper, 2 g. of p-tert-butyl catechol, and 30 ml. of butyl carbitol at 100–111° C. is added over a 3-hour period a solution of 430 g. of 2-butynediol-1,4 in 850 cc. of concentrated hydrochloric acid. A protective mixture of nitrogen and nitric oxide is passed continually over the reaction medium. The 2,3-dichlorobutadiene-1,3 which is formed steam distills out from the reaction vessel and is condensed into a receiver surrounded with crushed ice. During the first 20 minutes the 2-butynediol-1,4 solution is introduced in 10-ml. portions every 3 to 5 minutes; thereafter, 25-ml. portions are added every 5 to 7 minutes. 347 grams of oil is collected in the condensate. Fractional distillation gives 213 g. of 2,3-dichlorobutadiene-1,3 boiling at 43–46° C. (100 mm. Hg).

*Example 8*

To a well-stirred mixture of 170 cc. of concentrated hydrochloric acid, 59.4 g. of cuprous chloride and 3 g. copper at 108–110° C. is added over a 100-minute period a solution of 21.5 g. of 2-butynediol-1,4 in 85-ml. concentrated hydrochloric acid. Nitrogen containing about 1% nitric oxide is continually passed over the reaction medium. The 2,3-dichlorobutadiene-1,3 which is formed steam distills out from the reaction vessel and is condensed into a receiver surrounded with crushed ice.

*Example 9*

To a 500-cc. round-bottom flask equipped with a stirrer, thermometer, gas inlet, and distillation head are added 125 ml. of concentrated hydrochloric acid, 25 g. of cuprous chloride, and 1 g. of copper powder. A nitrogen atmosphere is provided. Hydrogen chloride is bubbled into the mixture and external heat is applied to bring the mixture to boiling. Then 25 g. of a 40% aqueous solution of 2-butynediol-1,4 is added over a half-hour period. In the steam distillate about 6.5 ml. (approximately 7.5 g.) of an oil is then obtained which is primarily 2,3-dichlorobutadiene-1,3.

*Example 10*

A. 33 grams of cuprous chloride, 50 g. of methylamine hydrochloride, 0.5 g. of copper powder, 0.1 g. of p-tert-butyl catechol and 75 ml. of concentrated hydrochloric acid are introduced into a reaction vessel and saturated with a stream of hydrogen chloride gas at room temperature. To the mixture obtained is added by stirring at room temperature a solution of 68.5 g. of 2-butynediol-1,4 in 40 ml. of concentrated hydrochloric acid. Heat evolution occurs. After about 2 hours external heat is applied. The mixture is heated with stirring to 80° C. during the next 1½ hours while a stream of hydrogen chloride gas is continually introduced.

The mixture is then maintained at 80° C. for about 40 minutes. Finally, steam distillation is carried out. About 27 g. of 2,3-dichlorobutadiene-1,3 is separated from the distillate.

B. When calcium chloride or zinc chloride are substituted for cuprous chloride in the process of Part A above only tars are obtained.

*Example 11*

A mixture containing 25 ml. of 1,4-dibromobutyne-2, 5.7 grams of cuprous bromide, 2.3 grams of methylamine hydrobromide, 5 ml. of dimethylformamide, and 0.1 gram of p-tert-butyl catechol is refluxed at a head temperature of 45–50° C. (20–25 mm. Hg) for a period of about an hour in a 100-ml. round-bottom flask equipped with a magnetic stirrer. The reaction mixture is then distilled nearly to dryness. The distillate is washed with water and redistilled, giving 31 grams of 2,3-dibromobutadiene-1,3, B.P. 45–50° C. (20–25 mm. Hg).

*Example 12*

To a stirred mixture of 35 grams of cuprous bromide in 344 grams of concentrated hydrobromic acid at 115–123° C., there is added over about two hours a solution of 95 grams of 2-butynediol-1,4 in 172 grams of concentrated hydrobromic acid. A protective mixture of nitrogen and nitric oxide is passed continuously over the reaction mixture. The 2,3-dibromobutadiene-1,3 distills from the reaction vessel as it is formed and is collected in a receiver surrounded by ice water. Distillation of the collected oil yields 52 grams of 2,3-dibromobutadiene-1,3 boiling at 45° C. at a pressure of 45 mm. or at 50° C. at a pressure of 25 mm. Hg.

*Example 13*

To a boiling solution containing 60 grams of cuprous chloride, 5.5 grams of hydrogen chloride, 60 grams of hydrogen bromide, 15 grams of potassium chloride, 24 grams of potassium bromide, and 275 grams of water, in a flask fitted with an agitator, additional funnel, take-off condenser, and gas inlet, there is added over 80 minutes 250 cc. of aqueous solution which contains 74 grams of 2-butynediol-1,4, 37.5 grams of hydrogen chloride, and 85 grams of hydrogen bromide. The reaction products are distilled from the flask continuously. A mixture of nitrogen and nitric oxide is passed through the flask during the entire operation. The distillate is separated into its two phases, and there is obtained an oil phase weighing 61 grams and containing 35 mole percent of 2-chloro-3-bromobutadiene-1,3, 5 mole percent of 2,3-dichlorobutadiene-1,3 and 15 mole percent of 2,3-dibromobutadiene-1,3.

*Example 14*

A catalyst is prepared in a 1-liter, three-neck creased flask equipped with thermometer, stirrer, and reflux condenser from 57.4 grams of cuprous bromide, 39.6 grams of cuprous chloride, 52.4 grams of potassium bromide, 32.7 grams of potassium chloride, 0.5 gram of sodium nitrite, and 61.0 grams of water. The catalyst mixture is heated to 84° C., and copper powder (2.0 grams) and concentrated hydrochloric acid (2.5 cc.) are added. Nitrogen is introduced through a tube inserted in the condenser in order to exclude air. 1,4-dichlorobutyne-2 (12.3 grams) is added, and the mixture is stirred vigorously at 85° C. for 30 minutes. After being allowed to stand without agitation for a few minutes, the condenser is set to distill and the oil is distilled off, along with water from the catalyst. Water is added to replace the water thus removed. The oil, after separation from the aqueous portion of the distillate, comprises a mixture of dihalobutadienes as follows: 2,3-dibromobutadiene-1,3, 58 mole percent; 2-chloro-3-bromobutadiene-1,3, 34 mole percent; 2,3-dichlorobutadiene-1,3, 4 mole percent. The mixture also contains 4 mole percent unreacted 1,4-dichlorobutyne-2.

As many widely different embodiments of this invention may be made without departing from the spirit and scope thereof, it is to be understood that this invention is not limited to the specific embodiments thereof except as defined in the appended claims.

What is claimed is:

1. A process for the preparation of 2,3-dihalobutadiene-1,3 which comprises contacting 1,4-dihalobutyne-2 at a temperature of from about 20° C. to 150° C. with a liquid catalyst, said catalyst being obtained by mixing a cuprous halide and a solubilizing agent which yields halide ions in the reaction medium, and recovering the 2,3-dihalobutadiene-1,3 which forms; with the proviso that the halogen atoms in each instance are selected from the group consisting of chlorine and bromine.

2. A process according to claim 1 wherein the solubilizing agent which yields halide ions in the reaction medium is selected from the group consisting of hydrogen halide, amine hydrohalides, ammonium halide, alkali metal halides and alkaline earth halides.

3. A process for the preparation of 2,3-dichlorobutadiene-1,3 which comprises contacting 1,4-dichlorobutyne-2 at a temperature of from about 20° C. to 150° C. with a liquid catalyst, said catalyst being obtained by mixing cuprous chloride and a solubilizing agent which yields chloride ions in the reaction medium, and recovering the 2,3-dichlorobutadiene-1,3 which forms.

4. A process according to claim 3 wherein the solubilizing agent is methylamine hydrochloride.

5. A process for the preparation of 2,3-dibromobutadiene-1,3 which comprises contacting 1,4-dibromobutyne-2 at a temperature of from about 20° C. to 150° C. with a liquid catalyst, said catalyst being obtained by mixing cuprous bromide and a solubilizing agent which yields bromide ions in the reaction medium and recovering the 2,3-dibromobutadiene-1,3 which forms.

6. A process according to claim 5 wherein the solubilizing agent is methylamine hydrobromide.

7. A process for the preparation of 2,3-dihalobutadiene-1,3 which comprises contacting 2-butynediol-1,4 at a temperature of from about 60° C. to 150° C. in the presence of hydrogen halide with a liquid catalyst, said catalyst being obtained by mixing cuprous halide and a solubilizing agent which yields halide ions in the reaction medium, there being at least two molecules of hydrogen halide for each molecule of 2-butynediol-1,4, and recovering the 2,3-dihalobutadiene-1,3 which forms; with the proviso that the halogen atoms in each instance are selected from the group consisting of chlorine and bromine.

8. A process according to claim 7 wherein the solubilizing agent is selected from the group consisting of hydrogen halide, amine hydrohalides, ammonium halide, alkali metal halides and alkaline earth halides.

9. A process according to claim 8 wherein the solubilizing agent is potassium chloride.

No references cited.